United States Patent
Wang et al.

(10) Patent No.: US 12,315,106 B2
(45) Date of Patent: May 27, 2025

(54) FRAME SEQUENCE QUALITY BOOSTER USING INFORMATION IN AN INFORMATION REPOSITORY

(71) Applicant: MediaTek Inc., Hsinchu (TW)

(72) Inventors: Yao-Sheng Wang, Hsinchu (TW); Pei-Kuei Tsung, Hsinchu (TW); Chiani Lu, Hsinchu (TW); Chao-Min Chang, Hsinchu (TW); Yu-Sheng Lin, Hsinchu (TW); Wai Mun Wong, Singapore (SG)

(73) Assignee: MediaTek Inc., Hsinchu (TW)

( * ) Notice: Subject to any disclaimer, the term of this patent is extended or adjusted under 35 U.S.C. 154(b) by 455 days.

(21) Appl. No.: 17/939,939

(22) Filed: Sep. 7, 2022

(65) Prior Publication Data

US 2023/0087097 A1    Mar. 23, 2023

Related U.S. Application Data

(63) Continuation-in-part of application No. 17/894,947, filed on Aug. 24, 2022.

(60) Provisional application No. 63/246,833, filed on Sep. 22, 2021.

(51) Int. Cl.
     *G06T 3/4046*      (2024.01)
     *G06T 3/4053*      (2024.01)
     *G06T 5/77*      (2024.01)

(52) U.S. Cl.
     CPC .......... *G06T 3/4046* (2013.01); *G06T 3/4053* (2013.01); *G06T 5/77* (2024.01)

(58) Field of Classification Search
     None
     See application file for complete search history.

(56) References Cited

U.S. PATENT DOCUMENTS

| | | | |
|---|---|---|---|
| 9,240,070 B2* | 1/2016 | Anderson-Sprecher | G06T 15/005 |
| 9,262,806 B2* | 2/2016 | Gevrekci | G06T 7/20 |
| 9,300,869 B2* | 3/2016 | Marvit | H04N 23/951 |
| 10,783,611 B2* | 9/2020 | Vemulapalli | G06T 3/4046 |
| 11,632,498 B1* | 4/2023 | Mowry | G03B 17/48 348/222.1 |
| 11,785,351 B1* | 10/2023 | Mowry | G06T 7/74 348/222.1 |
| 11,960,996 B2* | 4/2024 | Kim | G06V 10/993 |
| 2006/0104346 A1* | 5/2006 | Li | H04N 19/152 375/E7.184 |

(Continued)

FOREIGN PATENT DOCUMENTS

| | | |
|---|---|---|
| CN | 113158905 A | 7/2021 |
| WO | 2006080655 A1 | 8/2006 |

*Primary Examiner* — Anand P Bhatnagar
(74) *Attorney, Agent, or Firm* — Tong J. Lee

(57) ABSTRACT

A booster engine enhances the quality of a frame sequence. The booster engine receives, from a first stage circuit, the frame sequence with quality degradation in at least a frame. The quality degradation includes at least one of uneven resolution and uneven frame per second (FPS). The booster engine queries an information repository for reference information on the frame, using a query input based on at least a region of the frame to obtain a query output. The booster engine then applies a neural network to the query input and the query output to generate an optimized frame, and sends an enhanced frame sequence including the optimized frame to a second stage circuit.

20 Claims, 11 Drawing Sheets

(56) References Cited

U.S. PATENT DOCUMENTS

| | | | |
|---|---|---|---|
| 2009/0080854 A1* | 3/2009 | Arai | H04N 9/8042 |
| | | | 386/280 |
| 2015/0296188 A1* | 10/2015 | Meganathan | G08B 13/19682 |
| | | | 348/143 |
| 2016/0277645 A1* | 9/2016 | Bitouk | G06T 7/246 |
| 2022/0101123 A1* | 3/2022 | Kim | G06T 5/60 |
| 2022/0374714 A1* | 11/2022 | Nayak | G06T 1/20 |

* cited by examiner

FRAME SEQUENCE QUALITY BOOSTER USING INFORMATION IN AN INFORMATION REPOSITORY

CROSS-REFERENCE TO RELATED APPLICATIONS

This application is a continuation-in-part of U.S. application Ser. No. 17/894,947 filed on Aug. 24, 2022, and claims the benefit of U.S. Provisional Application No. 63/246,833 filed on Sep. 22, 2021, the entirety of which is incorporated herein by reference.

TECHNICAL FIELD

Embodiments of the invention relate to image and video processing for frame quality enhancement.

BACKGROUND

A typical edge electronic device, such as a television, a smartphone, a wearable device, a portable computing device, a gaming device, etc., has limited computing power due to strict requirements on power consumption and thermal performance. Graphics rendering operations on an edge device generally incur a significant amount of graphics processing unit (GPU) workload. To maintain a target frame rate for smooth image display, the edge device may suffer from high power consumption. Sometimes the target frame rate is unachievable due to various resource constraints, such as high computation workload and power consumption limits. Thus, there is a need for improving image processing techniques to minimize the impact of resource constraints on frame quality.

SUMMARY

In one embodiment, a method is performed by a booster engine for enhancing the quality of a frame sequence. The method includes the booster engine receiving, from a first stage circuit, the frame sequence with quality degradation in at least a frame. The quality degradation includes at least one of uneven resolution and uneven frame per second (FPS). The method further includes the booster engine querying an information repository for reference information on the frame, using a query input based on at least a region of the frame to obtain a query output. The booster engine then applies a neural network to the query input and the query output to generate an optimized frame, and sends an enhanced frame sequence including the optimized frame to a second stage circuit.

In another embodiment, a system is operative to enhance the quality of a frame sequence. The system includes a first stage circuit to transmit the frame sequence with quality degradation in at least a frame. The quality degradation including at least one of uneven resolution and uneven FPS. The system further includes a booster engine circuit, which is operative to receive the frame sequence, and query an information repository for reference information on the frame, using a query input based on at least a region of the frame to obtain a query output. The booster engine then applies a neural network to the query input and the query output to generate an optimized frame, and sends an enhanced frame sequence including the optimized frame to a second stage circuit.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Figure 1:
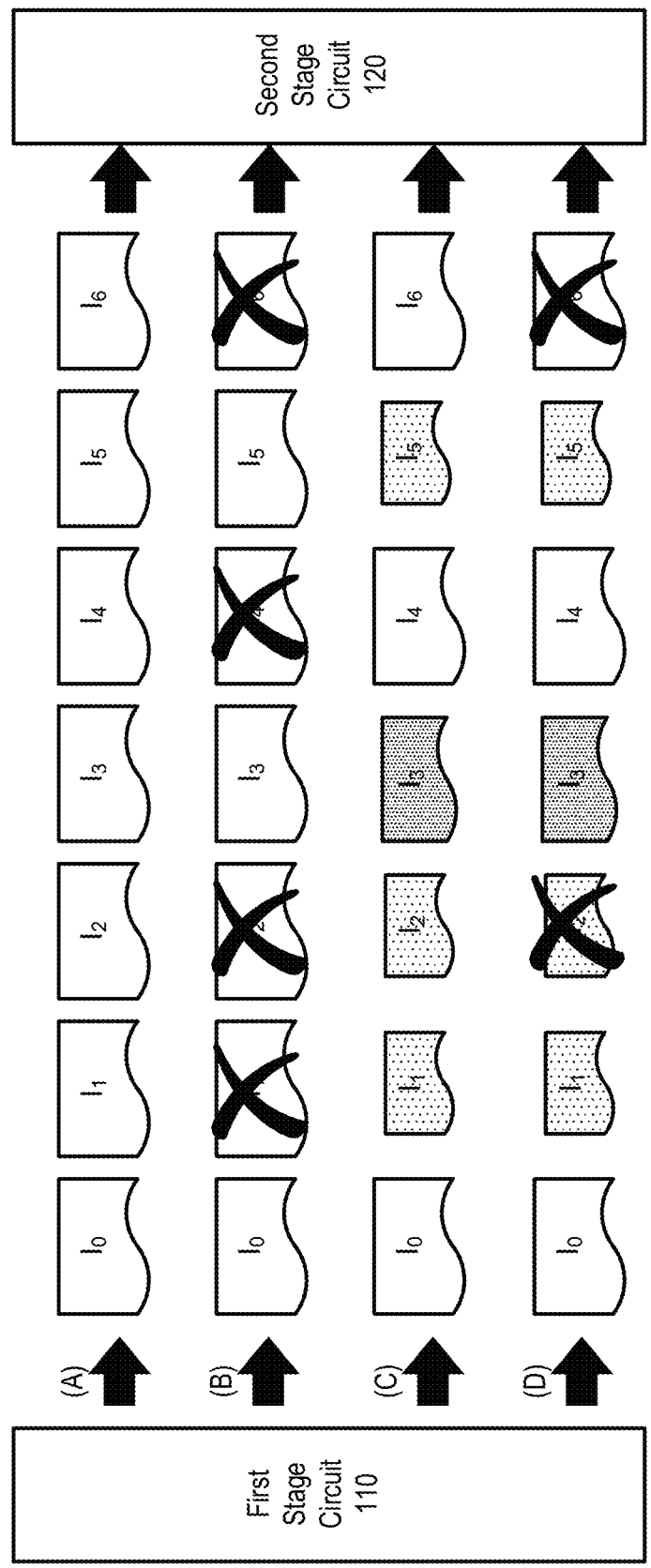
FIG. 1 illustrates a number of frame sequence examples according to some embodiments.

FIG. 1 illustrates a number of frame sequence examples according to some embodiments. A first stage circuit 110 transmits a frame sequence to a second stage circuit 120. The quality of the frame sequence may sometimes be unstable; that is, from time to time the frame rate of the frame sequence may be lower than a target frame per second (FPS), and some frames in the frame sequence may have lower resolution than others. The first stage circuit 110 may output any of the frame sequences shown in the following non-limiting examples. Row (A) shows a frame sequence with even quality in which all frames ($I_0$-$I_6$) are generated by the first stage circuit 110 at a target FPS and at a target resolution. Row (B) shows an uneven FPS condition in which frames $I_1$, $I_2$, $I_4$, and $I_6$ are lost in transmission or not generated (e.g., not rendered) by the first stage circuit 110. In a frame sequence with an uneven FPS condition, the frame rate (also referred to as the FPS) is dynamically changing without following a regular pattern.

Row (C) shows an uneven resolution condition in which frames $I_0$, $I_4$, and $I_6$ have the target resolution (e.g., 2400×1080), frame $I_3$ has a resolution (e.g., 1600×720) lower than the target resolution, and frames $I_1$, $I_2$, and $I_5$ have the lowest resolution (e.g., 600×270) in the frame sequence. In a frame sequence with an uneven resolution, the resolution of the frames is dynamically changing without following a regular pattern. Row (D) shows a combination of uneven FPS and uneven resolution conditions. Rows (B), (C), and (D) provide non-limiting examples of a frame sequence with an uneven quality condition. It is understood that a frame sequence with an uneven quality condition may have any combination of uneven FPS and uneven resolution, including having uneven FPS only or uneven resolution only. Although the examples herein show uneven quality conditions, it is understood that the first stage circuit 110 may also transmit a frame sequence with even quality degradation, e.g., a frame sequence in which every other frame is missing or low resolution.

In the following description, a frame sequence with an uneven quality condition may also be referred to as a frame sequence having quality degradation in multiple frames that are unevenly spaced in time. In the example of row (B), the missing frames $I_1$, $I_2$, $I_4$, and $I_6$ are unevenly spaced in time, where the spacing is one frame interval between $I_1$ and $I_2$, two frame intervals between $I_2$ and $I_4$, and two frame intervals between $I_4$ and $I_6$. Similarly, in the examples of rows (C) and (D), the missing and/or low-resolution frames are unevenly spaced in time. Thus, it should be understood that the term "uneven" hereinafter can be interpreted as "non-uniform across a frame sequence".

The first stage circuit 110 may determine or be requested to generate a frame sequence with an uneven quality condition due to resource constraints. Non-limiting examples of resource constraints include insufficient transmission bandwidth, high computation workload, power consumption limit, etc. In one embodiment, the first stage circuit 110 may reduce the quality of those frames with low or slow-changing information contents. Alternatively or additionally, the first stage circuit 110 may reduce the quality of one or more frames when a constrained resource has exceeded its usage threshold; e.g., when the power consumption exceeds a threshold. A quantity may be "insufficient", "high", "slow", or "low" when it is compared to a predetermined threshold value. In one embodiment, the first stage circuit may use a host circuit or run a background thread to monitor the usage of constrained resources. When the host circuit or the thread detects that a constrained resource usage exceeds a threshold, it notifies the first stage circuit to adjust the quality degradation of the frame sequence. Such quality degradation may include at least one of uneven resolution and uneven FPS. Non-limiting examples of constrained resources include one or more of computational resources, power resources, and transmission bandwidth.

The first stage circuit 110 and second stage circuit 120 may be any two endpoints of a frame sequence propagation network or connection. In one embodiment, the first stage circuit 110 and the second stage circuit 120 may be located in the same electronic device, such as a graphics processing unit (GPU) and a display panel in the same device. In another embodiment, the first stage circuit 110 and the second stage circuit 120 may be located in different devices such as a transmitter (Tx) device and a receiver (Rx) device connected by a transmission network.

The first stage circuit 110 can dynamically adjust the frame quality, during rendering and/or transmission, to produce a frame sequence with an uneven quality condition. The adjustment may include temporal reduction and/or spatial reduction. Temporal reduction refers to the reduction of the FPS; e.g., reducing the number of rendered frames and/or transmitted frames per time unit. Spatial reduction refers to the reduction of the frame resolution; e.g., reducing the number of pixels in rendered and/or transmitted frames. As shown in rows (B) and (D) of FIG. 1, the temporal reduction may be uneven; e.g., the time intervals between two immediately adjacent frames may vary from time to time. Furthermore, as shown in rows (C) and (D) of FIG. 1, the spatial reduction may be uneven; e.g., the low-resolution frames may not occur at regular time intervals. The uneven quality condition in a frame sequence, such as FPS reduction and/or resolution reduction, can save a significant amount of computation, bandwidth, and/or power resources of the first stage circuit 110. The first stage circuit 110 can adjust the quality reduction with great flexibility to achieve a balanced and smooth trade-off between frame quality and resource usage.

As will be described in further detail later, the disclosed system further includes a booster engine to recover from the quality reduction of the frame sequence. The booster engine may be activated on demand. In one embodiment, the booster engine receives a frame sequence from the first stage circuit 110, enhances the frame quality, and sends the enhanced frame sequence to the second stage circuit 120. The frame sequence may have an uneven quality condition or an even quality condition. In an embodiment where the booster engine is co-located with the first stage circuit 110 such as a GPU, the booster engine can offload the rendering operations from the GPU. The offloading of the rendering operations may enable the system to increase the FPS with acceptable power consumption. In another embodiment where the booster engine is at the Rx device of a transmission network, the booster engine may serve as a stabilizer to stabilize the frame quality received by the Rx device.

Figure 2:
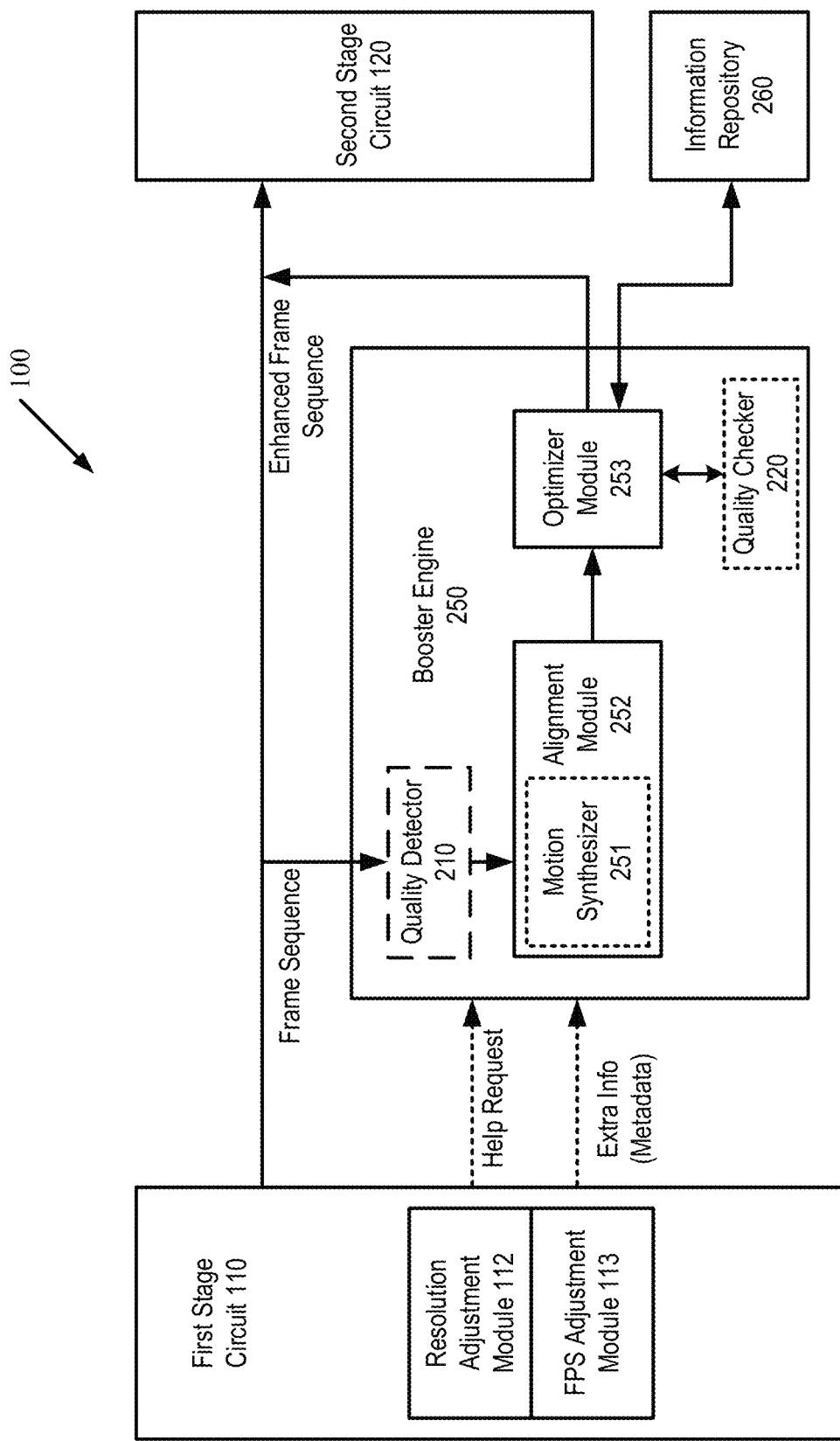
FIG. 2 is a block diagram illustrating a system for boosting the quality of a frame sequence according to one embodiment.

FIG. 2 is a block diagram illustrating a system 100 for boosting the quality of a frame sequence according to one embodiment. The elements indicated by dotted lines represent those elements that may be absent in some alternative embodiments. The system 100 includes the first stage circuit 110 coupled to the second stage circuit 120 via a connection (e.g., a bus connection or a transmission network connection). A booster engine 250 is coupled to the connection and is operative to enhance the quality of a frame sequence transmitted from the first stage circuit 110 to the second stage circuit 120. The booster engine 250 may be a special-purpose hardware circuit, a general-purpose processor executing software containing instructions for frame quality enhancement, software executed by a processor, or a combination of both hardware circuit and software instructions. Thus, in some embodiments, the booster engine 250 is also referred to as a booster engine circuit. The frame quality enhancement performed by the booster engine 250 may include super-resolution, frame interpolation and/or extrapolation, inpainting, image alignment, motion synthesis, etc.

In one embodiment, the first stage circuit 110 includes a resolution adjustment module 112 and an FPS adjustment module 113. The first stage circuit 110 dynamically adjusts the frame quality using the resolution adjustment module 112 to generate low-resolution frames and/or the FPS adjustment module 113 to change the frame rate. In one embodiment, the system 100 may also include a host processor (not shown) that controls the operations of the first stage circuit 110. The system 100 monitors the system resource usage such as computational resource utilization, power consumption, transmission bandwidth utilization, etc. When a resource usage reaches a limit, the first stage circuit 110 or the host processor activates one or both of the resolution adjustment module 112 and the FPS adjustment module 113 to adjust (e.g., reduce) the output frame quality. The adjustment may be made as needed, e.g., the reduction in resolution and/or frame rate may be made to any frames at any time intervals. One or both of the resolution adjustment module 112 and an FPS adjustment module 113 may be implemented by special-purpose hardware circuits, software containing instructions executable by a processor, or a combination of hardware circuits and software instructions. In one embodiment, both the resolution adjustment module 112 and the FPS adjustment module 113 may be part of a GPU rendering pipeline.

In one embodiment, the first stage circuit 110 may generate extra information including metadata regarding low-resolution frames and missing frames, and send the extra information to the booster engine 250. For example, the first stage circuit 110 may render frame (N), but skip rendering frame (N+1) or render frame (N+1) in low resolution. To help the booster engine 250 to improve the frame quality, the first stage circuit 110 may generate the metadata describing the properties of frame (N+1) and send the metadata to the booster engine 250. The metadata may include information on frame (N+1) regarding any of the following: depth, texture, normal, color, instance segmentation, motion vector information (e.g., optical flow), frame resolution, and the like. It should be understood that the booster engine 250 may enhance the frame quality with or without the extra information from the first stage circuit 110.

In one embodiment, the first stage circuit 110 may send a help request to the booster engine 250 for frame quality enhancement. The help request may indicate the quality reduction strategy such as FPS reduction and/or resolution reduction. The help request may also provide indices of the frames having the quality reduction. For example, the help request may include a frame insertion request indicating the positions of the frames that are not rendered or not transmitted in a frame sequence. The booster engine 250 can perform motion synthesis and alignment to insert these missing frames.

In one embodiment, the booster engine 250 includes an alignment module 252 coupled to an optimization module 253. The alignment module 252 performs temporal and spatial alignment of images with respect to their respective reference frames. The alignment module 252 performs geometry transformation, frames interpolation and/or extrapolation, and other post-processing including but not limited to blending. The alignment module 252 may utilize the motion information (which may be included in the metadata) sent from the first stage circuit 110 to perform the aforementioned operations. Alternatively, the alignment module 252 may include a motion synthesizer 251 to generate the motion information. The motion synthesizer 251 can extract motion information from the frames; e.g., by generating motion vectors and optical flows between a current frame (i.e., the frame currently being processed by the booster engine 250) and a reference frame. The motion information may include an acceleration estimation of the objects in the frames.

The optimizer module 253 performs frame optimization operations including but not limited to super-resolution (SR), inpainting, blending, sharpening, and other image processing operations. In one embodiment, the optimizer module 253 may include artificial intelligence (AI) models that have been trained to perform optimization operations. For example, the optimizer module 253 may include an AI SR model for up-scaling a low-resolution image to a higher resolution image. The optimizer module 253 may also include an AI inpainting model to repair an image with a number of missing pixels (e.g., a hole in the image). The output of the quality optimizer 253 may be sent to the second circuit 120.

One or more of the motion synthesizer 251, the alignment module 252, and the optimization module 253 in the booster engine 250 may be implemented by special-purpose hardware circuits, software containing instructions executable by a processor, or a combination of both. Depending on the information transmitted from the first stage circuit 110, platform capability, and/or the target output quality, the booster engine 250 may activate one or more of the motion synthesizer 251, the alignment module 252, and the optimization module 253 to improve the frame quality.

In one embodiment, the booster engine 250 includes a quality detector 210 that detects the quality of frames in the frame sequence transmitted from the first stage circuit 110 to the second stage circuit 120. When the quality detector 210 detects an uneven quality condition in the frame sequence; e.g., uneven FPS and/or uneven resolution, the booster engine 250 activates the alignment module 252 and the optimizer module 253 to improve the frame quality. With the quality detector 310, the help request from the first stage circuit 110 may no longer be needed.

In this embodiment, the output of the optimizer module 253 is checked by a quality checker 220, which compares the quality of a frame output from the optimizer module 253 with a quality threshold. If the frame quality does not meet the quality threshold, the output falls back to the original frame that is received by the booster engine 250. For example, the original frame may have lost too much information such that the inpainting performed by the optimizer module 253 has an unacceptable quality.

In an alternative embodiment, the booster engine 250 can operate to improve the frame quality without the extra information (e.g., the metadata) from the first stage circuit 110. For example, the booster engine 250 may calculate any of the following: depth, texture, normal, color, instance segmentation, motion vector information (e.g., optical flow), frame resolution, etc., from the received frame sequence to perform motion estimation and compensation, frame interpolation/extrapolation, alignment, super-resolution, inpainting, etc.

In an embodiment where the first stage circuit 110 does not provide the extra information or the provided extra information does not include motion information, the motion synthesizer 251 can use the information in one or more previous frames to generate optical flows for motion estimation and compensation.

Alternative or in addition to the extra information provided by the first stage circuit 110, the booster engine 250 may leverage the information provided by other sources. In one embodiment, the booster engine 250 may query (i.e., search) an information repository 260 using a query input that includes the contents in a given frame as indexes to obtain reference information. The output of the information repository 260 is then used to boost the quality of the given frame. In one embodiment, the information repository 260 may include any information accessible through the Internet; e.g., the information provided by the World Wide Web (i.e., the Web). The booster engine 250 may search for the information using a proprietary or public search engine. Alternatively, the information repository 260 may include a database, which is locally or remotely accessible by the booster engine 250 through a public or proprietary connection by wired or wireless means.

Figure 3:
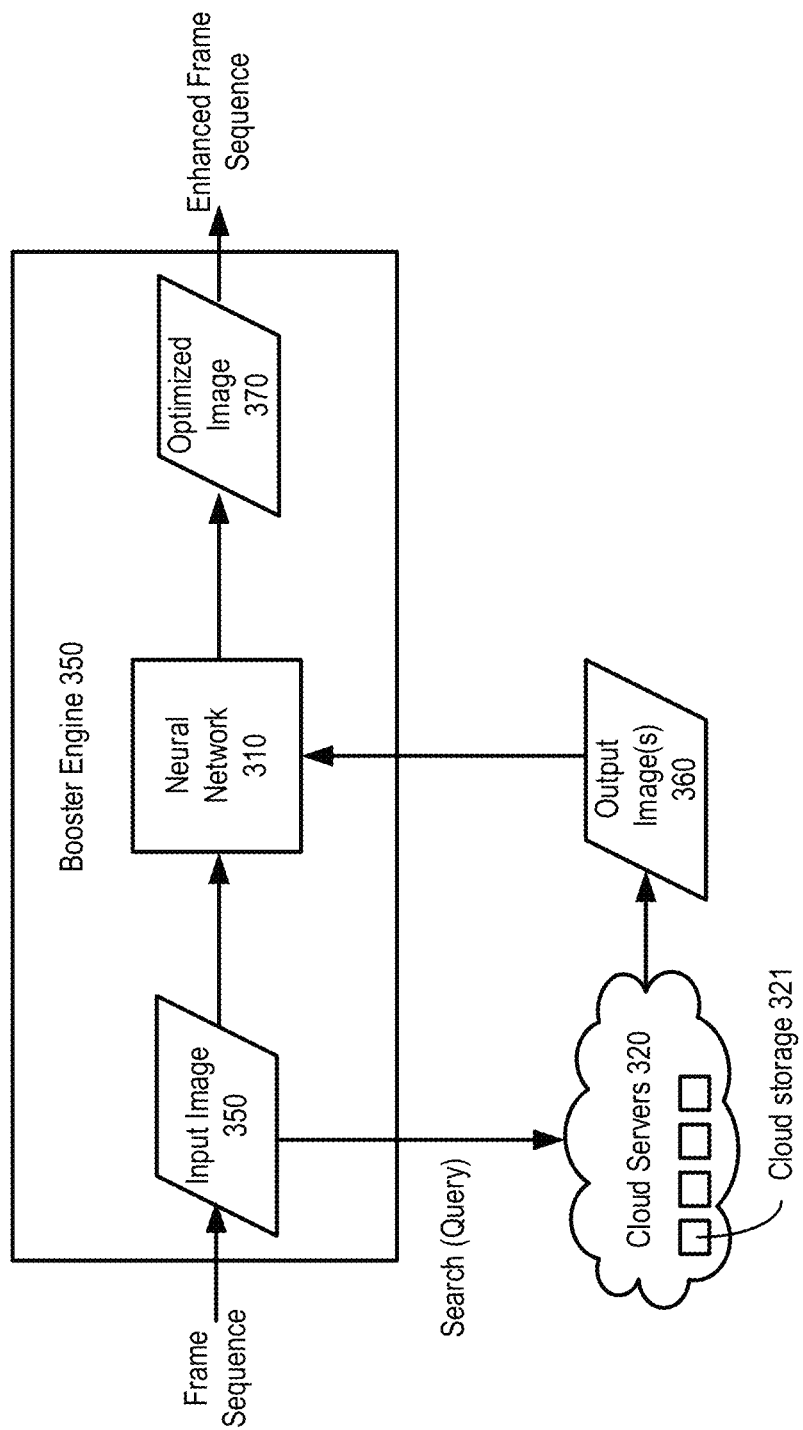
FIG. 3 is a block diagram illustrating a boosting engine according to one embodiment.

FIG. 3 is a diagram illustrating an example of booster engine operations using the information provided by cloud servers 320 according to one embodiment. In this embodiment, a booster engine 350 includes a neural network 310 to process the query output and generate an optimized image 370. The booster engine 350 may be an example of the booster engine 250 in FIG. 2. The booster engine 350 may send a search request at runtime to the cloud servers 320, where the search request includes an input image 350. The search request may be sent via the Internet. In one embodiment, the cloud servers 320 manages image information stored in cloud storages 321. The input image 350 may be one of the frames in the frame sequence, an interpolated frame, an extrapolated frame, or a portion of a frame. The input image 350 may have degraded image quality such as low resolution or missing pixel data. The output image(s) 360 generated by the search may improve the quality of the input image 350 by inpainting, super-resolution, or other image processing techniques. The input image 350 and the output image(s) 360 are fed into the neural network 310, which performs SR operations or inpainting operations to produce an optimized image 370. The optimized image 370 is part of the enhanced frame sequence to be sent to the second stage circuit 120.

Figure 4:
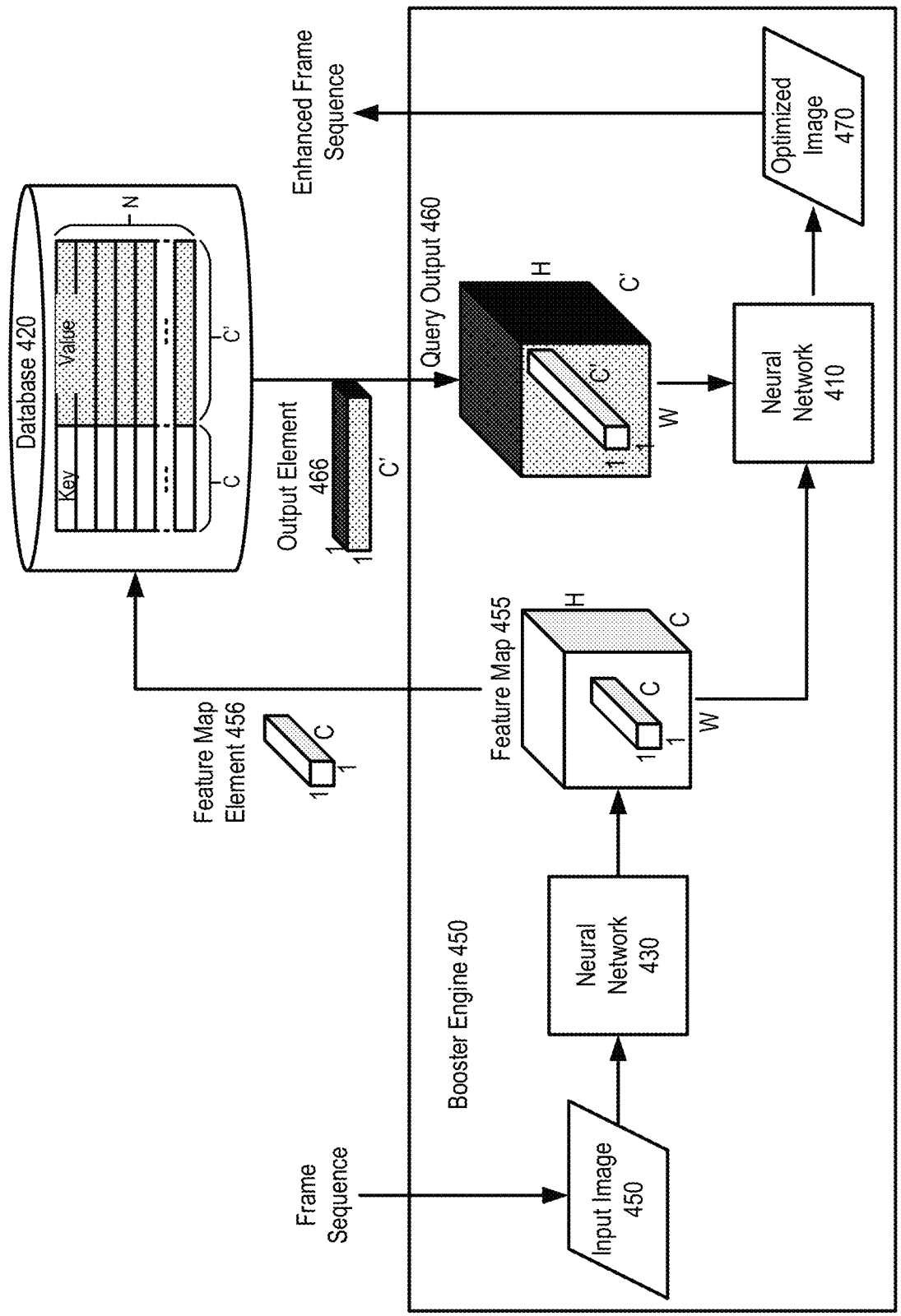
FIG. 4 is a block diagram illustrating a boosting engine according to another embodiment.

FIG. 4 is a diagram illustrating an example of booster engine operations using the information provided by a database 420 according to one embodiment. The database 420 stores a collection of N (key, value) pairs, where each key is of length C and each value is of length C', where C and C' may be different. That is, the length of each key is independent of the length of its corresponding value. The keys and values are trainable parameters. The booster engine 250 may send a search request at runtime to the database 420, where the search request includes a feature map 455 generated by a neural network 430 from an input image 450, which may be the same as the input image 350 in FIG. 3.

The feature map 455 has dimensions H (height)×W (width)×C (channel), also denoted as (H, W, C). The feature map 455 includes H×W of feature map elements 456, each element having dimensions (1, 1, C). For each feature map element 456, the booster engine 250 queries the database 420 to obtain an output element 466 of dimensions (1, 1, C'). Thus, when the query input is the entire feature map 455, the database 420 produces a query output 460 of dimensions (H, W, C'). The query output 460 and the feature map 455 are sent to a neural network 410, which performs SR operations or inpainting operations to produce an optimized image 470. The optimized image 470 is part of the enhanced frame sequence to be sent to the second stage circuit 120.

FIGS. 5-8 describe operations to query, extend, and update the database 420 according to some embodiments. In an embodiment where the database 420 is managed by the booster engine 420, these database operations may be performed by the booster engine 450. In another embodiment where the database 420 is managed by an entity different from the booster engine 420, these database operations may be performed by that entity (e.g., a database server) in response to a request submitted by the booster engine 450. Although the following disclosure describes a booster engine performing the database operations with reference to FIGS. 5-8, it should be understood that the booster engine may perform, or cause another entity (e.g., a database server) to perform, the disclosed database operations with reference to FIGS. 5-8.

Figure 5:
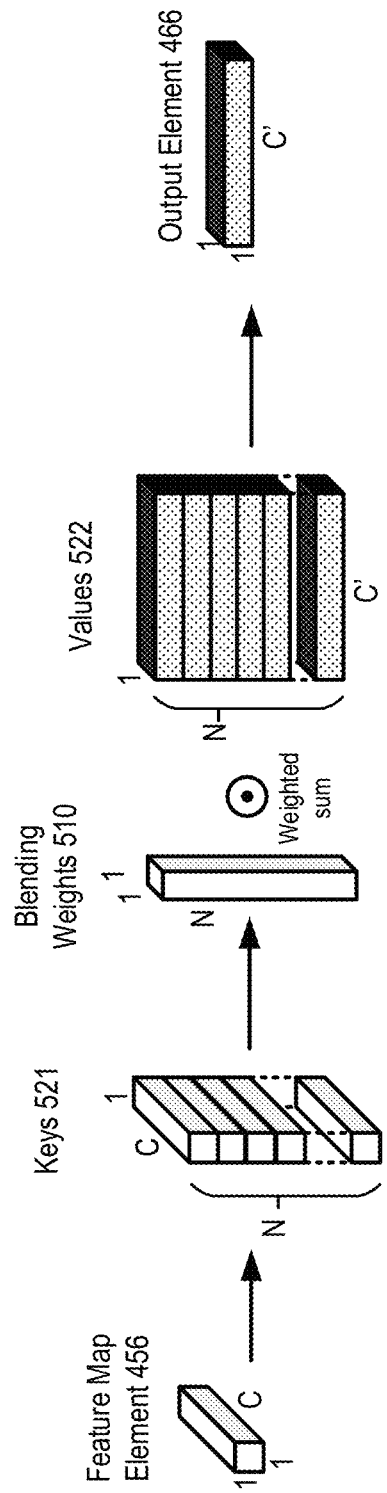
FIG. 5 is a diagram illustrating a database query according to one embodiment.

FIG. 5 illustrates query operations of the database 420 according to one embodiment. According to the embodiment of FIG. 5, the database 420 (FIG. 4) includes N pairs of keys 521 and values 522. Each feature map element 456 is used to query the N keys 521 to produce N blending weights 510; e.g., cross-correlation may be applied to each feature map element 456 and the N keys 521. Each blending weight 510 is an indication of similarity between the query (i.e., the feature map element 456) and the corresponding key. The blending weights 510 are applied to the values 522 (e.g., by convolution or matrix product) to produce a weighted sum of values 522. The weighted sum is an element of the query 460 (e.g., the output element 466 in FIG. 4). The calculations of blending weights and weighted sum are repeated to generate the output query 460.

In one embodiment, the booster engine 450 may extend and/or update the database 420 at runtime, or cause the database 420 to be extended and/or updated at runtime. The database extension and update may be based on the frames received by the booster engine 450 at runtime.

Figure 6:
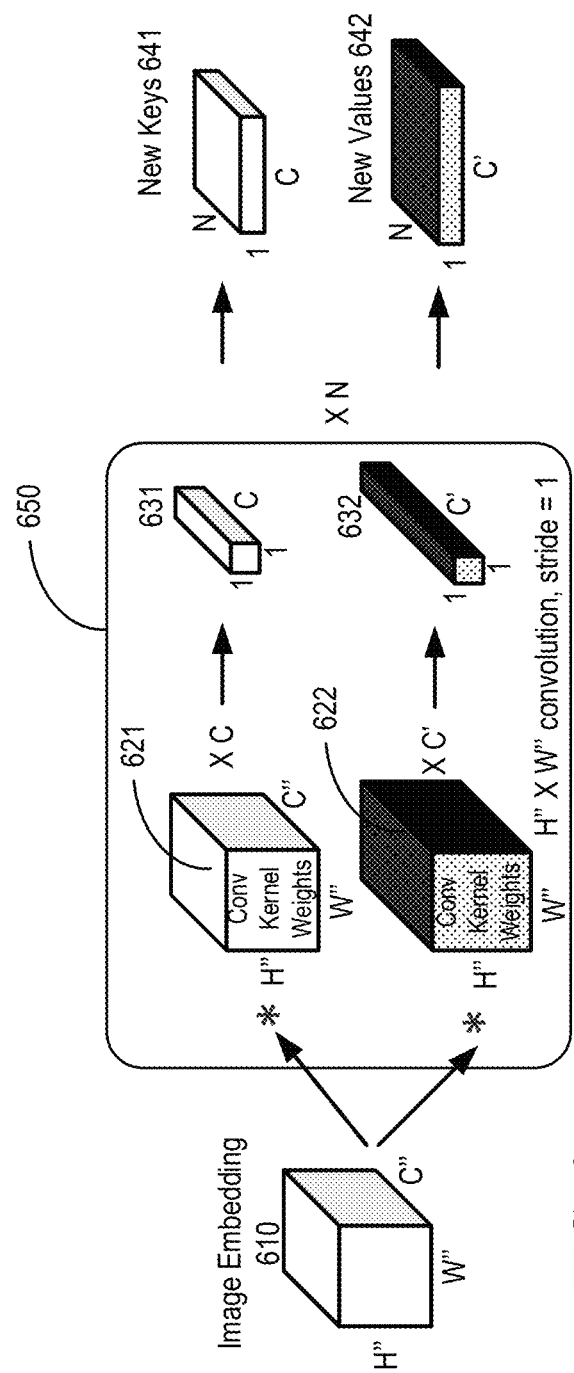
FIG. 6 is a diagram illustrating the calculation of new (key, value) pairs according to one embodiment.

FIG. 6 is a diagram illustrating the calculation of new (key, value) pairs according to one embodiment. Referring also to FIG. 4, in one embodiment, the calculation may be performed by the booster engine 450 and the new (key, value) pairs are submitted to the database 420. Initially, the booster engine 450 calculates an image embedding 610 from a frame or a portion of a frame using a neural network such as the neural network 430. The image embedding 610 may be the feature map 455 or a portion thereof. The image embedding 610 has dimensions (H", W", C"), which may or may not be the same as the dimensions of the feature map (H, W, C). The booster engine 450 performs operations 650 N times on the image embedding 610 to produce new keys 641 and new values 642. According to operations 650, the image embedding 610 is convolved with convolution kernel weights 621 of dimensions (H", W", C"). The convolution has a stride size=1. Each convolution produces a pixel of dimensions (1, 1, 1). The convolution is repeated C times to obtain a new key element 631 of dimension (1, 1, C). Similarly, the image embedding 610 is convolved with convolution kernel weights 622 of dimensions (H", W", C") with stride size=1. The convolution is repeated C' times to obtain a new value element 632 of dimension (1, 1, C'). The operations 650 are repeated N times with a different set of convolution kernel weights 621 and a different set of convolution kernel weights 622 each time. The convolution kernel weights 621 and 622 are trainable parameters. The N repetitions produce the N new keys 641 and the N new values 642.

Figure 7:
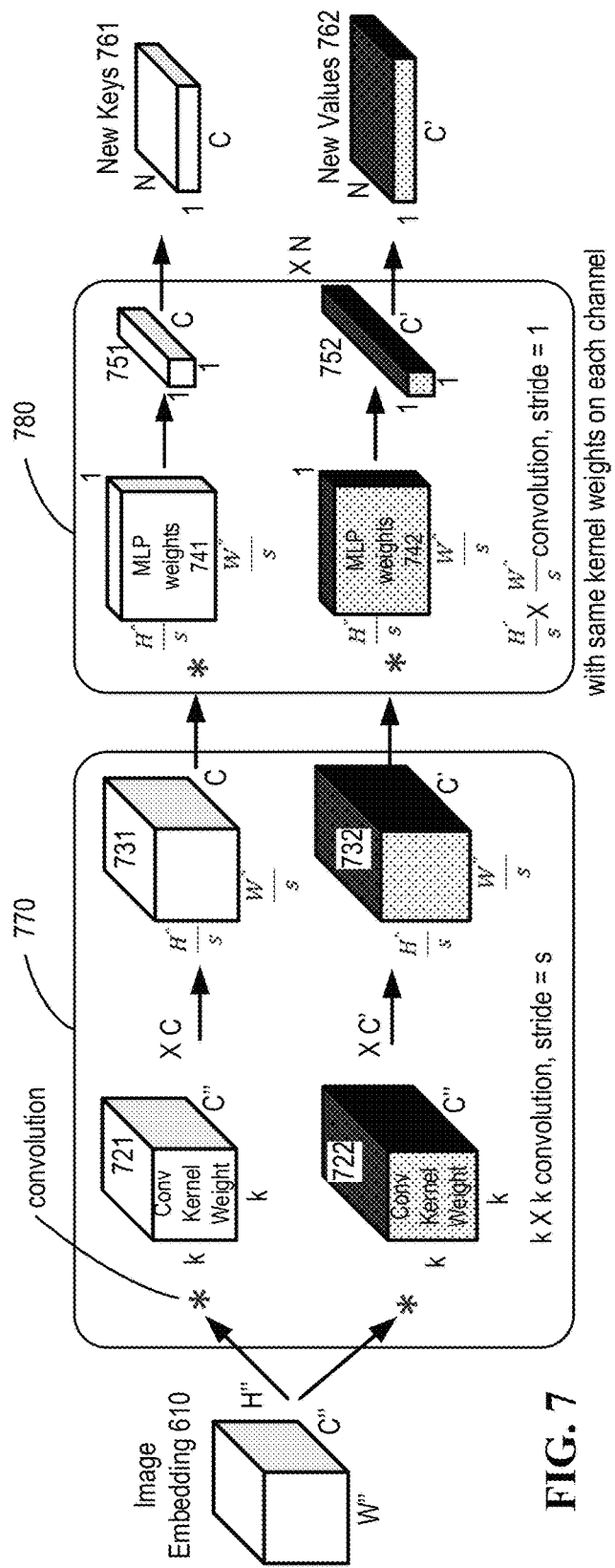
FIG. 7 is a diagram illustrating the calculation of new (key, value) pairs according to another embodiment.

FIG. 7 is a diagram illustrating the calculation of new (key, value) pairs according to another embodiment. Referring also to FIG. 4, in one embodiment, the calculation may be performed by the booster engine 450 and the new (key, value) pairs are submitted to the database 420. The booster engine 450 performs operations 770 followed by N times operations 780 on the image embedding 610 to produce new keys 761 and new values 762. According to operations 770, the image embedding 610 is convolved with convolution kernel weights 721 of dimensions (k, k, C"). The convolution has a stride size=s. The convolution is repeated C times to produce an intermediate key element 731 of dimensions $$\left(\frac{H''}{s}, \frac{W''}{s}, C\right).$$

According to operations 780, a set of multi-layer perception (MLP) weights 741 of dimensions $$\left(\frac{H''}{s}, \frac{W''}{s}, 1\right).$$

are convolved with the intermediate key element 731 to produce a new key element 751 of dimensions (1, 1, C). The convolution is a $$\left(\frac{H''}{s}, \frac{W''}{s}\right)$$

convolution having stride size=1, and the same kernel weights are applied to each of the C channels.

Furthermore, according to operations 770, the image embedding 710 is convolved with convolution kernel weights 722 of dimensions (k, k, C") with stride size=s. The convolution is repeated C times to produce an intermediate value element 732 of dimensions $$\left(\frac{H''}{s}, \frac{W''}{s}, C'\right).$$

According to operations 780, a set of MLP weights 742 of dimensions $$\left(\frac{H''}{s}, \frac{W''}{s}, 1\right)$$

are convolved with the intermediate value element 732 to produce a new value element 752 of dimensions (1, 1, C). The convolution is a $$\left(\frac{H''}{s}, \frac{W''}{s}\right).$$

convolution having stride size=1, and the same kernel weights are applied to each of the C' channels. Operations 780 are repeated N times to produce the N new keys 761 and the N new values 762. Each repetition uses a different set of MLP weights 741 and a different set of MLP weights 742. The convolution kernel weights 721 and 722 and the MLP weights 741 and 742 are trainable parameters.

The new (key, value) pairs calculated in accordance with the operations in FIG. 6 and FIG. 7 may be used to extend and/or update the database 420. For example, the booster engine 450 may extend the database 420 by adding a new (key, value) pair to the existing pairs. The booster engine 450 may also update the database 420 by replacing an existing (key, value) pair with the new pair to control the size of the database storage. The existing pair to be replaced may be the oldest or least-used pair. Alternatively or additionally, the booster engine 450 may update the database 420 by parametrized update, where the speed of update is controlled by parameters α and β.

Figure 8:
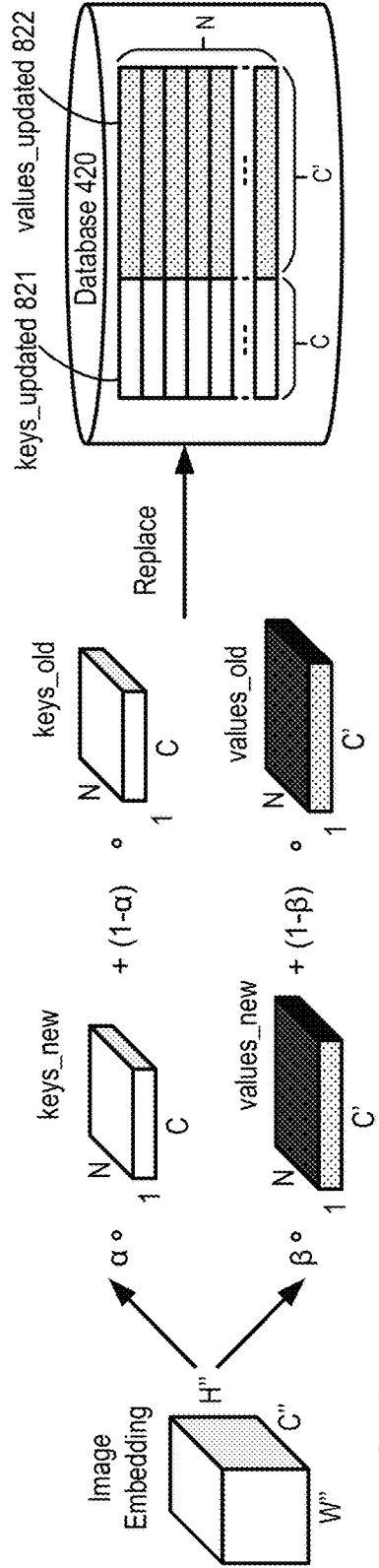
FIG. 8 is a diagram illustrating operations to update a database according to one embodiment.

FIG. 8 is a diagram illustrating operations to update a database according to one embodiment. In this example, N pairs of updated keys 821 and updated values 822 are calculated as: (keys_updated, values_updated= (α·keys_new+(1−α)·keys_old, β·values_new+(1−β)·keys_old), where α and β are parameters in the range [0, 1]. When α=β=0, the N existing (key, value) pairs in the database 420 are unchanged. When α=β=1, the N existing (key, value) pairs in the database 420 are completely replaced by the new (key, value) pairs. In another embodiment, the update may be performed on one or more (key, value) pairs at a time.

Figure 9:
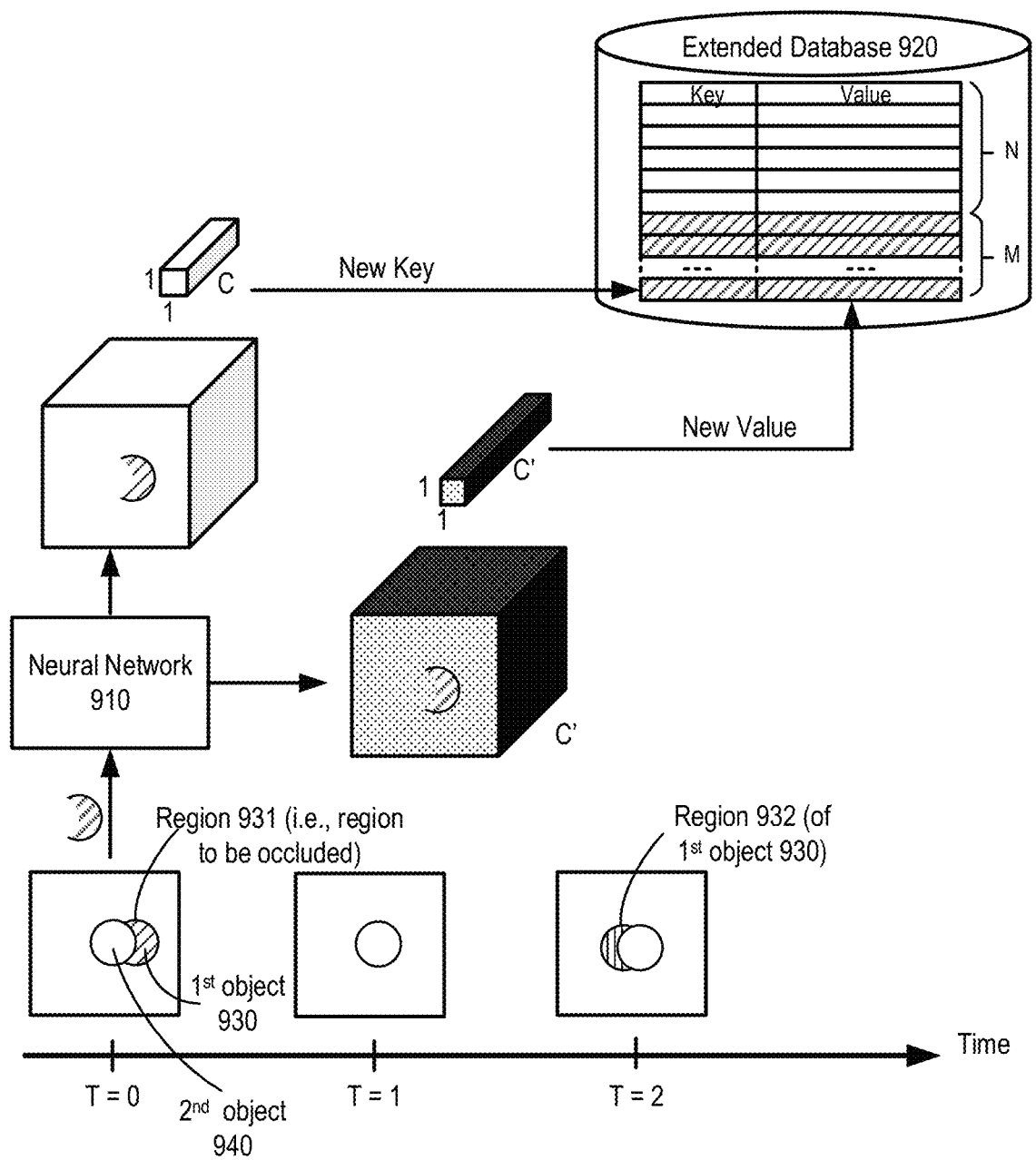
FIG. 9 is a diagram illustrating database extension based on a portion of a frame according to one embodiment.
Figure 10:
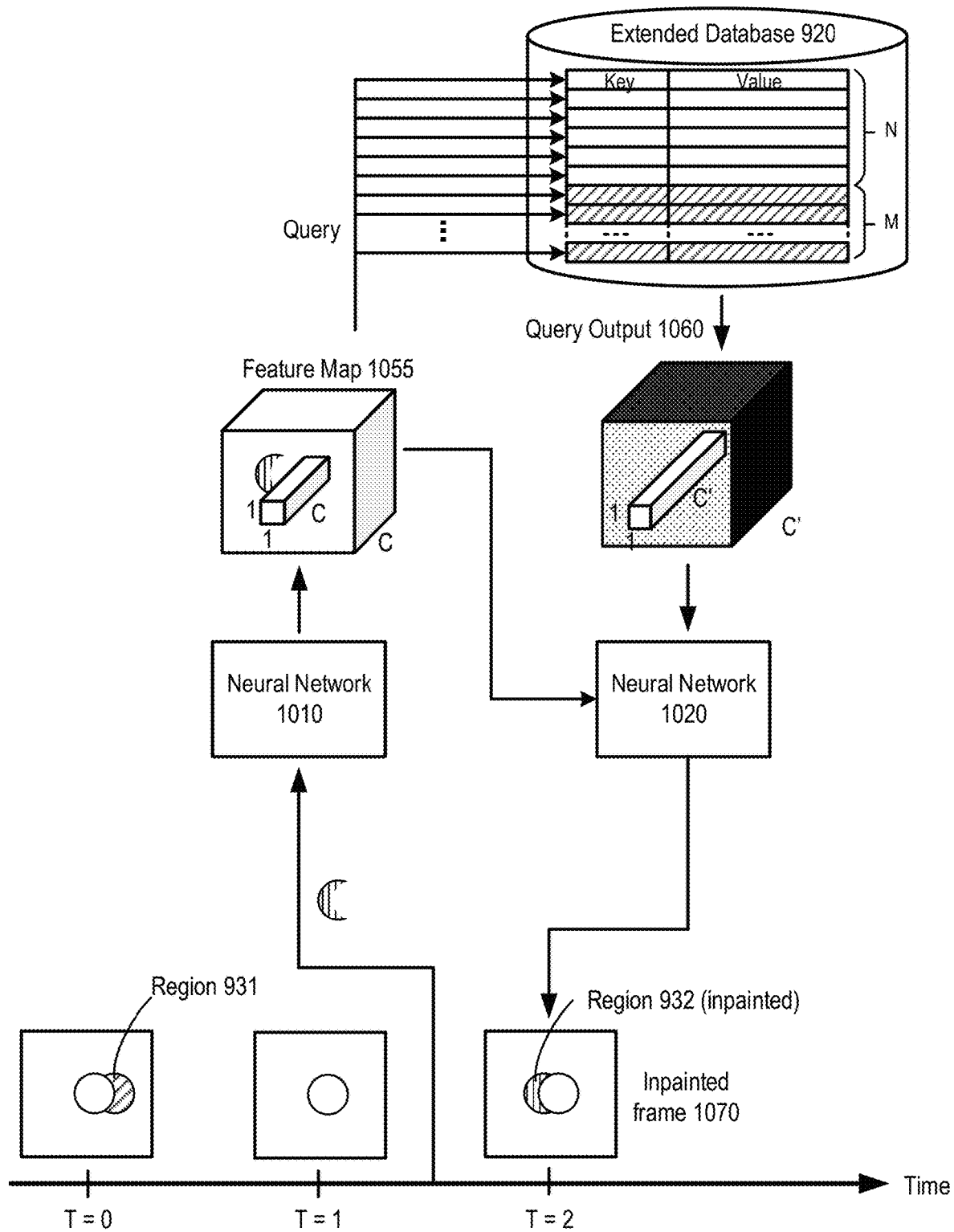
FIG. 10 is a diagram illustrating the use of an extended database for inpainting according to one embodiment.
Figure 11:
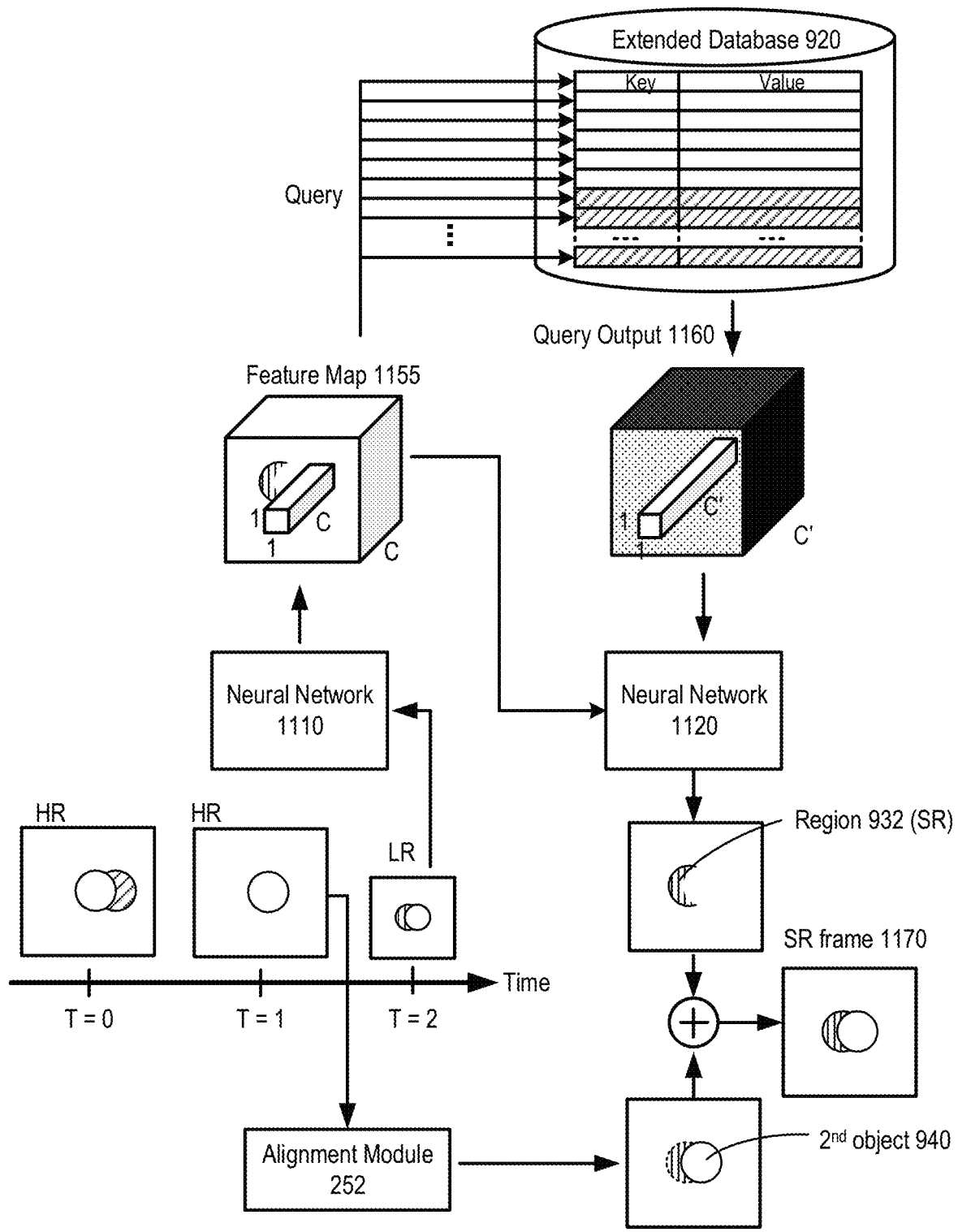
FIG. 11 is a diagram illustrating the use of an extended database for super-resolution (SR) according to one embodiment.

FIGS. 9-11 use frames received by the booster engine 450 at time instants T=0, 1, 2 as an example. It is understood that the three frames at T=0, 1, 2 are not continuous frames in the frame sequence received by the booster engine 450; there are multiple intermediate frames in the frame sequence between the time instants shown in the figures. The three frames show a first object 930 that moves from left to right relative to a second object 940. At T=0, a region 931 of the first object 930 is visible and the rest of the first object 930 is occluded by the second object 940. At T=1, the first object 930 is completely occluded by the second object 940. At T=2, a region 932 of the first object 930 is uncovered (i.e., visible), where region 932 is at least partially occluded at T=0.

FIG. 9 is a diagram illustrating database extension based on a portion of a frame according to one embodiment. Referring also to FIG. 4, the booster engine 450 may extend the database 420 by adding M (key, value) pairs to the existing N (key, value) pairs to produce an extended database 920. The booster engine 450 may calculate one or more of the M (key, value) pairs based on a portion of a frame; e.g., region 931 of the first object 930. The booster engine 450 may predict that region 931 is to be occluded and region 932 of the first object 930 may become visible in subsequent frames. The prediction may be based on motion synthesis on the frames between time instants 0 and 1. Although region 931 and region 932 are different regions, they belong to the same object and, therefore, information (values) derived from region 931 can be more useful for optimizing region 932 than other values in the extended database 920. When there is quality degradation in the subsequent frames (e.g., at T=2), the booster engine 450 may query the extended database 920 and benefit from (key, value) pairs that have information relevant to the first object 930. Moreover, the booster engine 450 may also extend a database based on an image region that is currently out-of-scene but may become in-scene in subsequent frames. Additionally, the booster engine 450 may extend a database based on high resolution (HR) frames, and the database query output can be used to sharpen the image in a subsequent low resolution (LR) frame.

In the example of FIG. 9, the booster engine 450 uses region 931 to calculate a (key, value) pair by applying a neural network 910 to region 931, where the neural network 910 may perform operations in accordance with the operations shown in FIG. 6 or FIG. 7. Encoding (e.g., by applying the neural network 910 to) a region of a frame instead of the entire frame saves database memory and reduces database search time. As the database stores information of interest per frame instead of an entire frame, the same amount of database memory can store information on more frames. The booster engine 450 then adds the calculated (key, value) pair or pairs to the extended database 920.

FIG. 10 is a diagram illustrating the use of an extended database for inpainting according to one embodiment. Referring also to FIG. 4, the booster engine 450 may detect that the first object 930 is moving relative to the second object 940. Based on motion synthesis on the frames between time instants 0 and 1, the booster engine 450 may predict the position of the first object 930 at T=2 as well as the visible region (i.e., region 932) of the first object at T=2. If the frame at T=2 is missing or the pixel data of region 932 is missing or corrupted, the booster engine 450 can construct a frame for T=2, where the frame includes region 932. In one embodiment, the booster engine 450 queries the extended database 920 using a neural network 1010 to generate a feature map 1055 as the query input. In this example, the booster engine 450 may apply the neural network 1010 to a portion of the frame predicted to be at T=2 (e.g., region 932 with missing pixels) to generate the feature map 1055. In accordance with the query operation illustrated in FIG. 5, the database 420 outputs an element (with dimensions (1, 1, C')) of a query output 1060 for each element (with dimensions (1, 1, C)) of the feature map 1055. The booster engine 450 then applies a neural network 1020 on the query output 1060 and the feature map 1055 to produce an inpainted frame 1070 for T=2, where the inpainted frame 1070 includes the inpainted region 932 of the first object 920.

FIG. 11 is a diagram illustrating the use of an extended database for super-resolution (SR) according to one embodiment. In this example, the frame at T=2 has a low resolution (LR) while the frames at T=0 and 1 have high resolution (HR). Referring also to FIG. 4, the booster engine 450 uses a portion of the LR frame including region 932 as input to a neural network 1110 to generate a feature map 1155. The booster engine 450 then queries the extended database 920 using the feature map 1155 as the query input. In accordance with the query operation illustrated in FIG. 5, the database 420 outputs an element (with dimensions (1, 1, C')) of a query output 1160 for each element (with dimensions (1, 1, C)) of the feature map 1155. The booster engine 450 then applies a neural network 1120 on the query output 1160 and the feature map 1155 to generate an SR version of region 932. The booster engine 450 may also use the frame at T=1 as a reference frame, and uses the alignment module 252 (FIG. 2) to align the second object 940 in frames at T=2 to the second object 940 in frames at T=1. The alignment output is added to the SR version of region 932 to produce an SR frame 1170 for T=2.

Figure 12:
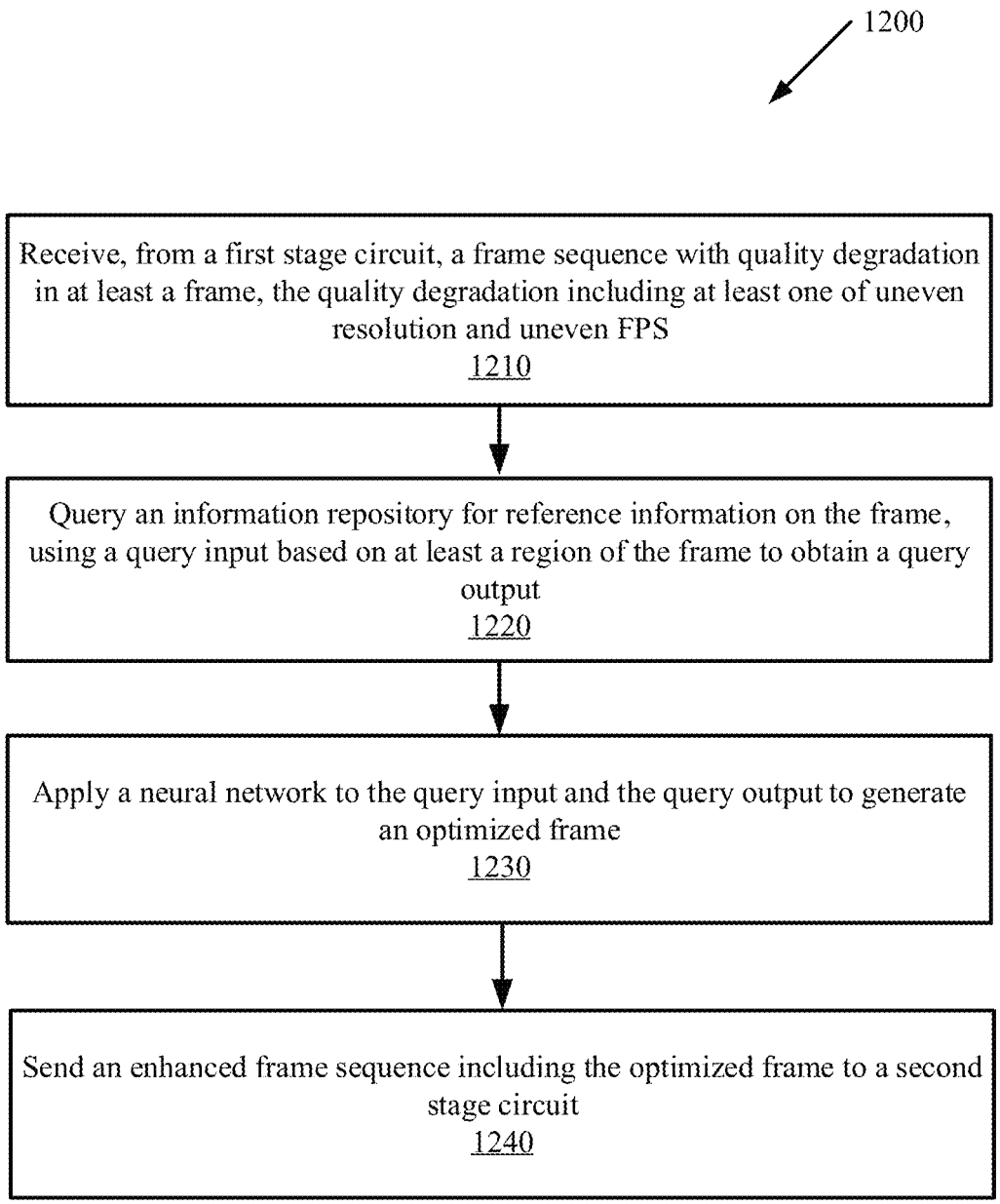
FIG. 12 is a flow diagram illustrating a method for a booster engine to enhance frame sequence quality according to one embodiment.

FIG. 12 is a flow diagram illustrating a method 1200 for enhancing frame sequence quality according to one embodiment. The method 1200 may be performed by a booster engine, such as the booster engine 250 (FIG. 2), 350 (FIG. 3), and/or 450 (FIG. 4). The booster engine enhances the quality of a frame sequence that is transmitted from a first stage circuit to a second stage circuit, such as the first stage circuit 110 and the second stage circuit 120 in FIGS. 1 and 2.

The method 1200 begins at step 1210 when the booster engine receives from a first stage circuit a frame sequence with quality degradation in at least a frame. The quality degradation includes at least one of uneven resolution and uneven frame per second (FPS). The booster engine at step 1220 queries an information repository for reference information on the frame, using a query input based on at least a region of the frame to obtain a query output. The booster engine at step 1230 applies a neural network to the query input and the query output to generate an optimized frame. The booster engine at step 1240 sends an enhanced frame sequence including the optimized frame to a second stage circuit.

In one embodiment, the neural network performs at least one of a super-resolution (SR) operation and an inpainting operation on the frame. The information repository may be accessible through the Internet; alternatively, the information repository is a database that is readable and writable by the booster engine. The database stores a set of keys and corresponding values. The length of each key is independent of the length of the corresponding value. In one embodiment, the booster engine may generate a feature map based on the frame (having the quality degradation) using a given neural network, use an element of the feature map to query the keys to generate a set of blending weights, and apply or cause to apply the set of blending weights to the corresponding values to generate an element of the query output.

In one embodiment, the booster engine may calculate an image embedding based on a first region of an object in a given frame of the frame sequence. The booster engine may further apply or cause to apply convolution kernel weights on the image embedding to obtain a new (key, value) pair, extend or cause to extend the database by adding the new (key, value) pair to the database, and query the database to obtain information on a second region of the object in a subsequent frame. The second region is at least partially occluded in the first frame and is visible in the subsequent frame.

In one embodiment, the booster engine may calculate an image embedding based on a first region of an object in a given frame of the frame sequence. The booster engine may further apply or cause to apply convolution kernel weights on the image embedding to obtain a new (key, value) pair, and update or cause to update an existing (key, value) pair in the database by combining the existing (key, value) pair and the new (key, value) pair.

In one embodiment, the first stage circuit, the booster engine, and the second stage circuit may be located within the same electronic device. Alternatively, the first stage circuit and the second stage circuit are in two electronic devices coupled to each other by a transmission network. Moreover, the neural networks disclosed herein are characterized by trainable parameters.

Figure 13:
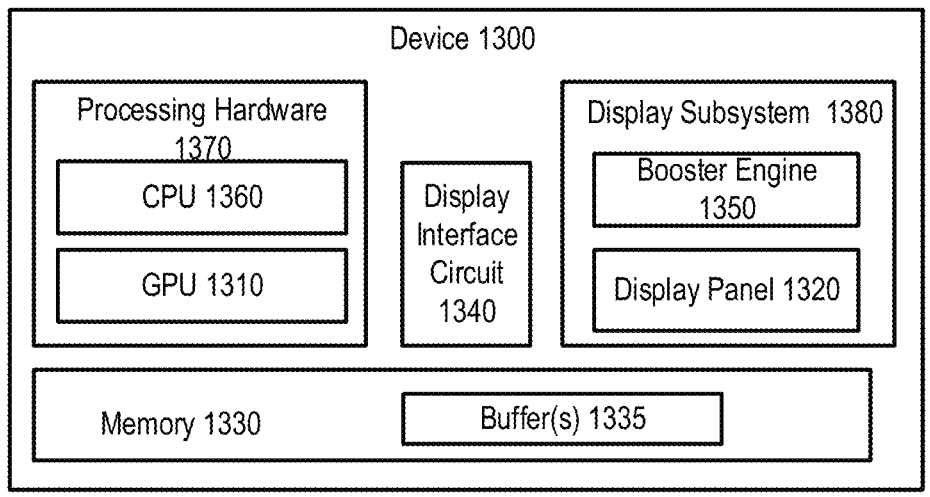
FIG. 13 illustrates an example of a device that performs frame sequence quality enhancement according to one embodiment.

FIG. 13 illustrates an example of a device 1300 according to one embodiment. The device 1300 may be a non-limiting example of the system 100 in FIG. 2. One example of the device 1300 is an electronic device having graphics processing capabilities. For example, the device 1300 may be a smartphone, a computing device, a network-connected device, a gaming device, an entertainment device, an Internet-of-things (IoT) device, or any device capable of processing and displaying images and/or videos.

The device 1300 includes processing hardware 1370. In one embodiment, the processing hardware 1370 includes a central processing unit (CPU) 1360, a GPU 1310, and one or more of: a digital processing unit (DSP), an artificial intelligence (AI) processor, a multimedia processor, other general-purpose and/or special-purpose processing circuitry. In one embodiment, the GPU 1310 may be the aforementioned first stage circuit 110 (FIGS. 1, 2, and 3), and the CPU 1360 is a host processor for the GPU 1310.

The device 1300 further includes a display subsystem 1380 coupled to the processing hardware 1370 via a display interface circuit 1340. In one embodiment, the display subsystem 1380 includes a booster engine 1350 and a display panel 1320. The display panel 1320 displays information such as images, videos, messages, games, texts, graphics, etc. In one embodiment, the display panel 1320 may be the aforementioned second stage circuit 120 (FIGS. 1 and 2), and the booster engine 1350 may be the booster engine 250 (FIG. 2), 350 (FIG. 3), and/or 450 (FIG. 4). The booster engine 1350 may be part of the display subsystem 1380. The booster engine 1350 may be implemented by hardware, or may be implemented by program code running on a general-purpose or special-purpose processing circuit. In one embodiment, the booster engine 1350 may include a hardware accelerator, such as an AI accelerator to perform frame quality optimization such as AI-based super-resolution, inpainting, and other image processing operations.

The device 1300 further includes a memory 1330 coupled to the processing hardware 1370 and the display subsystem 1380. The memory 1330 may include memory devices such as dynamic random access memory (DRAM), static random access memory (SRAM), flash memory, and other non-transitory machine-readable storage media; e.g., volatile or non-volatile memory devices. The memory 1330 includes one or more buffers 1335, such as a color buffer, a metadata buffer, a frame buffer, etc. The GPU 1310 may store rendered frames in the color buffer or the frame buffer, and store metadata in the metadata buffer, where the metadata includes information about those frames that are not rendered, and those frames having quality degradation (e.g., low resolution). In some embodiments, the memory 1330 may store instructions which, when executed by the processing hardware 1370, cause the processing hardware 1370 to perform the method 1200 of FIG. 12.

In one embodiment, the CPU 1360 may set a target refresh rate of the display interface circuit 1340 to control the rate at which images are output from the buffers 1335 to the display panel 1320, and may dynamically perform refresh-rate adjustment when there is a need. It is understood the embodiment of FIG. 13 is simplified for illustration purposes. Additional hardware components may be included. For example, the device 1300 may also include a network interface to connect to a wired and/or wireless network for transmitting and/or receiving voice, digital data and/or media signals.

Figure 14:
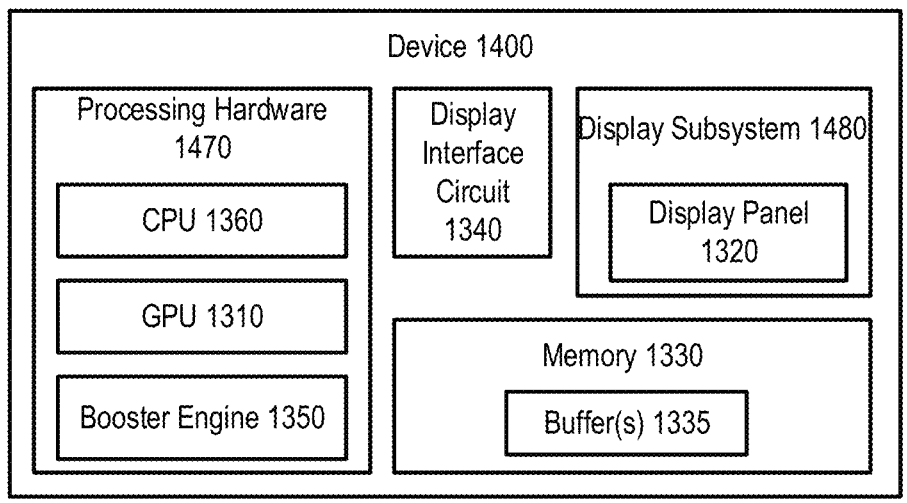
FIG. 14 illustrates an example of a device that performs frame sequence quality enhancement according to another embodiment.

FIG. 14 illustrates an example of a device 1400 according to another embodiment. The device 1400 may be a non-limiting example of the system 100 in FIG. 2. In FIGS. 13 and 14, the same numeral labels are used to refer to the same components. The device 1400 includes processing hardware 1470 and a display subsystem 1480. In this embodiment, the booster engine 1350 is part of the processing hardware 1470; e.g., the booster engine 1350 may be a co-processor to the GPU 1310, or may be implemented by program code running on a general-purpose or special-purpose processing circuit of the processing hardware 1470.

In the embodiments of FIGS. 13 and 14, the GPU 1310 can offload some of its rendering tasks to the booster engine 1350 to achieve a smooth image display on the display panel 1320. The offloading may occur in response to resource constraints such as insufficient computation capabilities or high power consumption. The offloading enables the display refresh rate to maintain at a default refresh rate (e.g., 60 FPS) or exceed the default refresh rate (e.g., 120 FPS).

Figure 15:
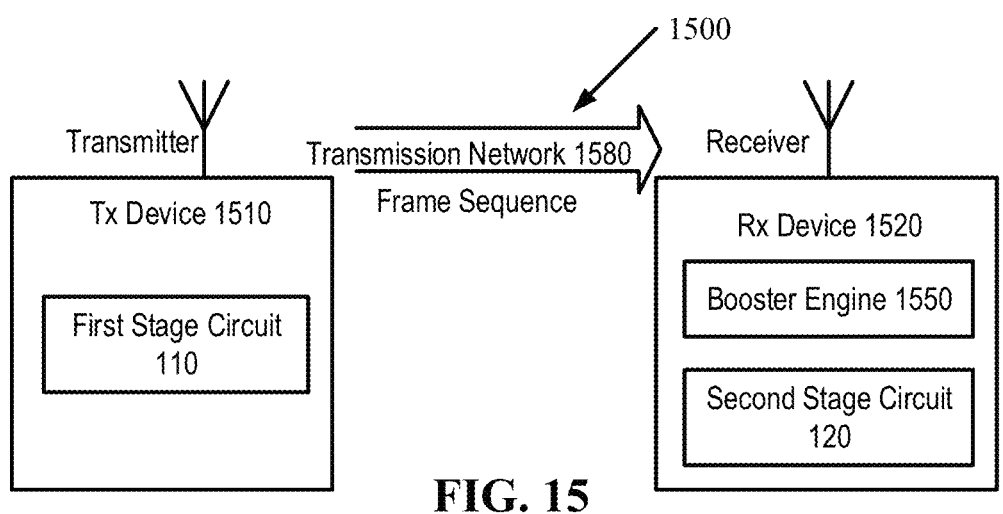
FIG. 15 illustrates an example of a system that performs frame sequence quality enhancement according to one embodiment.

FIG. 15 illustrates an example of a system 1500 according to one embodiment. The system 1500 may be a non-limiting example of the system 100 in FIG. 2. The system 1500 includes a transmitter (Tx) device 1510 and a receiver (Rx) device 1520 coupled to each other by a transmission network 1580. The transmission network 1580 may be a wired and/or wireless network; e.g., the Internet. Referring also to FIGS. 1 and 2, the Tx device 1510 includes the first stage circuit 110, and the Rx device 1520 includes the second stage circuit 120 and a booster engine 1550. The booster engine 1550 may be the booster engine 250 (FIG. 2), 350 (FIG. 3), and/or 450 (FIG. 4). In one embodiment, the Tx device 1510 and the Rx device 1520 may be any two endpoints in a transmission path of the frame sequence. As a non-limiting example, the Tx device 1510 may be a cloud server, from which the Rx device 1520 may download a frame sequence (e.g., a video). The quality of the frame sequence generated by the Tx device 1510 and received by the Rx device 1520 may be uneven in that the FPS and resolution of the frames may dynamically change due to unstable transmission bandwidth. The booster engine 1550 can stabilize the frame quality at the receiver end according to the aforementioned operations in connection with FIGS. 2-12.

The operations of the flow diagram of FIG. 12 have been described with reference to the exemplary embodiments of FIGS. 2-4. However, it should be understood that the operations of the flow diagram of FIG. 12 can be performed by embodiments of the invention other than the embodiments of FIGS. 2-4, and the embodiments of FIGS. 2-4 can perform operations different than those discussed with reference to the flow diagram. While the flow diagram of FIG. 12 shows a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits, or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method performed by a booster engine for enhancing quality of a frame sequence, comprising:
   receiving, from a first stage circuit, the frame sequence with quality degradation in at least a frame, wherein the quality degradation includes at least one of uneven resolution and uneven frame per second (FPS);
   querying an information repository for reference information on the frame, using a query input based on at least a region of the frame to obtain a query output;

applying a neural network to the query input and the query output to generate an optimized frame; and sending an enhanced frame sequence including the optimized frame to a second stage circuit.

2. The method of claim 1, wherein the neural network performs at least one of a super-resolution (SR) operation and an inpainting operation on the frame.

3. The method of claim 1, wherein the information repository is accessible through the Internet.

4. The method of claim 1, wherein the information repository is a database that is readable and writable by the booster engine.

5. The method of claim 4, wherein the database stores a plurality of keys and corresponding values, the method further comprises:
generating a feature map based on the frame using a given neural network;
using an element of the feature map to query the keys to generate a set of blending weights; and
applying or causing to apply the set of blending weights to the corresponding values to generate an element of the query output.

6. The method of claim 4, wherein the database stores a plurality of (key, value) pairs, and wherein the length of each key is independent of the length of a corresponding value.

7. The method of claim 4, further comprising:
calculating an image embedding based on a first region of an object in a given frame of the frame sequence;
applying or causing to apply convolution kernel weights on the image embedding to obtain a new (key, value) pair;
extending or causing to extend the database by adding the new (key, value) pair to the database; and
querying the database to obtain information on a second region of the object in a subsequent frame, wherein the second region is at least partially occluded in the first frame and is visible in the subsequent frame.

8. The method of claim 4, further comprising:
calculating an image embedding based on a first region of an object in a given frame of the frame sequence;
applying or causing to apply convolution kernel weights on the image embedding to obtain a new (key, value) pair; and
updating or causing to update an existing (key, value) pair in the database by combining the existing (key, value) pair and the new (key, value) pair.

9. The method of claim 1, wherein the first stage circuit, the booster engine, and the second stage circuit are located within a same electronic device.

10. The method of claim 1, wherein the first stage circuit and the second stage circuit are in two electronic devices coupled to each other by a transmission network.

11. A system operative to enhance quality of a frame sequence, comprising:
a first stage circuit to transmit the frame sequence with quality degradation in at least a frame, wherein the quality degradation including at least one of uneven resolution and uneven frame per second (FPS); and
a booster engine circuit operative to:
receive the frame sequence;
query an information repository for reference information on the frame, using a query input based on at least a region of the frame to obtain a query output;
apply a neural network to the query input and the query output to generate an optimized frame; and
send an enhanced frame sequence including the optimized frame to a second stage circuit.

12. The system of claim 11, wherein the neural network performs at least one of a super-resolution (SR) operation and an inpainting operation on the frame.

13. The system of claim 11, wherein the information repository is accessible through the Internet.

14. The system of claim 11, wherein the information repository is a database that is readable and writable by the booster engine.

15. The system of claim 14, wherein the database stores a plurality of keys and corresponding values, the booster engine circuit is further operative to:
generate a feature map based on the frame using a given neural network;
using an element of the feature map to query the keys to generate a set of blending weights; and
apply or cause to apply the set of blending weights to the corresponding values to generate an element of the query output.

16. The system of claim 14, wherein the database stores a plurality of (key, value) pairs, and wherein the length of each key is independent of the length of a corresponding value.

17. The system of claim 14, wherein the booster engine circuit is further operative to:
calculate an image embedding based on a first region of an object in a given frame of the frame sequence;
apply or cause to apply convolution kernel weights on the image embedding to obtain a new (key, value) pair;
extend or cause to extend the database by adding the new (key, value) pair to the database; and
query the database to obtain information on a second region of the object in a subsequent frame, wherein the second region is at least partially occluded in the first frame and is visible in the subsequent frame.

18. The system of claim 14, wherein the booster engine circuit is further operative to:
calculate an image embedding based on a first region of an object in a given frame of the frame sequence;
apply or cause to apply convolution kernel weights on the image embedding to obtain a new (key, value) pair; and
update or cause to update an existing (key, value) pair in the database by combining the existing (key, value) pair and the new (key, value) pair.

19. The system of claim 11, wherein the first stage circuit, the booster engine circuit, and the second stage circuit are located within a same electronic device.

20. The system of claim 11, wherein the first stage circuit and the second stage circuit are in two electronic devices coupled to each other by a transmission network.

* * * * *